United States Patent Office 3,303,747
Patented Feb. 14, 1967

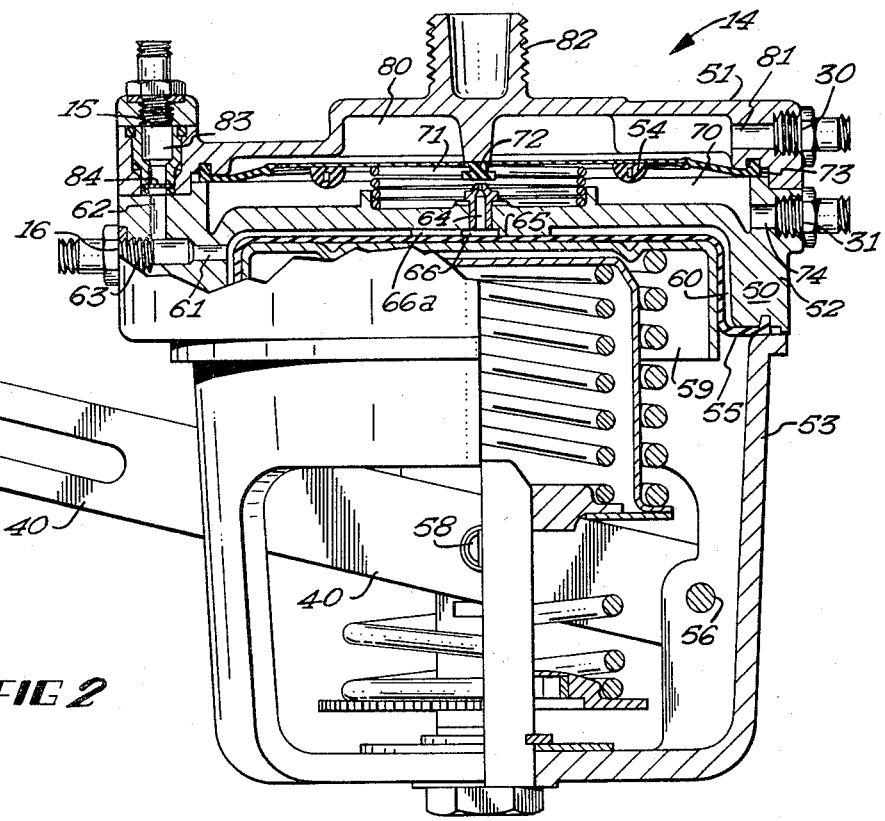

3,303,747
PRESSURE DIFFERENTIAL RELAY
Peter P. Demay, Chicago, and Joseph E. Hogel, River Grove, Ill., assignors to Honeywell Inc., a corporation of Delaware
Continuation of abandoned application Ser. No. 348,235, Feb. 28, 1964. This application Mar. 4, 1966, Ser. No. 534,567
5 Claims. (Cl. 91—47)

The present application is a continuation of the United States application Serial Number 348,235 filed February 28, 1964, now abandoned.

The present invention is directed to a pressure differential responsive device or relay. In more specific terms, the invention is directed to a pressure responsive device which senses the operation of a blower or similar piece of equipment and transmits a differential signal pneumatically to a pneumatic actuator. The actuator is thus provided with a positive control signal to put it into operation or to keep it from operating depending on the condition of operation of an air circulating device or blower.

In the unit ventilator art it is necessary to determine whether the ventilating blower or fan is in fact operating before the dampers and other equipment in the unit ventilator can be put into proper operation. In the past, the operation of the blower, which is driven by an electric motor, has been sensed by means of sensing the electric power to the blower motor. When power was supplied to the blower motor, an electric control device would be activated to control the pneumatic supply line to the pneumatic actuator that opens and closes the dampers of the unit ventilator. In this type of equipment certain types of failures are not sensed by the control equipment, and therefore certain malfunctions can occur. More specifically, if power is supplied to the motor of the blower, but for some reason or other the blower becomes inoperative, the electrical sensing device would indicate that the blower was on and that the damper actuator should be placed in an operative condition. It is obvious that if the electric motor was not running, but electric power was supplied to an electrical control device it is possible to open the dampers of the unit ventilator when the blower was not in fact running. This deficiency, along with the cost of electrical sensing equipment, makes their use undesirable.

In certain types of unit ventilator devices a pneumatic pressure differential switch has been utilized in connection with the blower motor to sense the operation of the blower. The pressure differential switch then provided either in a pneumatic or electric signal to the pneumatic actuator which allowed the operation of the actuator. It is obvious that the introduction of a separate pressure differential switch entails extra costs and also takes up space that is at an exceedingly great premium in unit ventilator devices.

It is a primary object of the present invention to disclose a pneumatic air motion type of relay that incorporates a pressure differential function and the pneumatic actuator function in a single, compact and economical device.

Another object of the present invention is to disclose a novel pressure differential responsive device that is exceedingly compact and which utilizes many commercially available parts.

Yet another object of the present invention is to disclose a pneumatic air motion relay that is more economical to produce and which takes less space than prior art devices.

Still a further object of the present invention is to disclose an air motion type of pneumatic relay which can be incorporated in existing unit ventilator equipment without any change in the physical space taken by the unit ventilators, since the present device takes little or no more additional space than the actuator currently in use in unit ventilator equipment.

These and other objects will become apparent when the present drawings are considered along with the detailed specification, wherein:

FIGURE 1 discloses a schematic representation of the invention incorporated in a very simple unit ventilator control system;

FIGURE 2 is a partial cross section of the air motion relay, in detail, and;

FIGURE 3 is a partial cross section of a second embodiment of the relay.

In FIGURE 1 there is schematically disclosed a control system utilizing the invention embodied in the present disclosure. A pipe 10 supplies pneumatic pressure to thermostat 11 which in turn controls pressure to a pneumatic pipe 12. Pipe 12 supplies a pneumatic pressure to a unit ventilator generally disclosed at 13. The unit ventilator 13 contains control apparatus 14, of the present invention. The pipe 12 connects at inlet 15 to the control device 14 to supply pneumatic pressure to the control device 14. An internal connection, disclosed in detail in FIGURE 2, supplies the pneumatic pressure from inlet 15 to the device 14 as well as to an outlet 16 which in turn is connected to pipe 17. Pipe 17, at T 20 supplies pneumatic pressure to a pneumatic actuator 21 that controls a valve 22. Valve 22 supplies an air conditioning media flow via pipe 23 to a heat exchanger 24. The pipe 17 also supplies pneumatic pressure to a temperature control device 25 of a pneumatic type.

A pair of ports 30 and 31 are respectively connected to tubes 32 and 33 that are placed across the inlet and outlet of a motor driven blower 34. The blower 34 is supplied with electric current by a pair of conductors 35 and 36, with conductor 35 passing through a control switch 37 to conductor 38 which is supplied with electrical energy. The control device 14 has a mechanical output lever 40 that controls a pair of damper blades 41 and 42 through a linkage 43 so that the position of the damper blades 41 and 42 can be changed in response to the movement of the lever 40.

All of the equipment described to this point, with the exception of the control device 14, constitute the conventional components of a unit ventilator device. The pneumatic pressure controlled by thermostat 11 supplies an operating pressure for the temperature control device 25, the valve 22 and the movement of lever 40 to position the dampers 41 and 42 along with the operation of the blower 34. When the switch 37 is closed so that power is supplied on conductors 35 and 36, the blower 34 operates generating a pressure differential in the pipes 32 and 33 to activate the control device 14, as will be described in detail in connection with FIGURE 2. As soon as control device 14 is activated, the pneumatic actuator 21 and its associated valve 22 along with the temperature control device 25 regulates the flow of the heating media to the heat exchanger 24 to utilize the air flow generated by the blower 34 in a conventional fashion. The equipment described in connection with FIGURE 1 has been undertaken in order to provide a clear basis and understanding of the application of the control device 14, which will now be described in detail in connection with FIGURE 2.

The control device 14 can be considered a pneumatic air motion relay. The terminology pneumatic air motion relay have been selected as descriptive of the control device 14 since the air motion generated by the blower 34 is supplied pneumatically to the control device 14 to activate the device as a switching or relay device, as will be described in detail. The pneumatic air motion relay 14 is made up of a housing means 50 which has a plurality of internal air tight chambers. The housing means 50 is composed of a number of castings 51, 52, and 53. The various castings that form the housing means 50 are held together by any convenient means, not shown. When the castings 51, 52, and 53 are assembled they seal around their respective peripheral edges to diaphragm means 54 and 55 into a fluid tight engagement within the castings in a conventional manner to provide a number of air tight chamber means.

The casting 53 has pivoted at 56 lever means 40 that is joined by a pin 58 to a cup 59 that rests on the underside of diaphragm 55. The elements just described form part of a pneumatic actuator portion or pneumatic actuator means for the pneumatic air motion relay 14. While the pneumatic actuator means has been shown in considerable detail, a description of the various components is believed unnecessary, as they are well known in the pneumatic control art. For a detailed discussion of a very similar unit, reference is directed to the United States Patent 2,655,180 to R. P. Roetter, which issued October 13, 1953. The pneumatic actuator portion has been shown as a step hesitating type of spring loaded or biased actuator and is disclosed in detail in the referenced United States patent. It is enough at this point to indicate that a downward movement of the diaphragm 55 forces the cup 59 to move in a downward direction and that the downward movement in turn is supplied to the pin 58 to pivot lever 40 about the pivot point 56 to supply an output motion to the lever 40 in response to the movement of the cup 59 and the diaphragm 55.

Immediately above the diaphragm 55 is the casting 52 which is basically concentric with the cup 59 and the casting 52 forms an air chamber 60 between the diaphragm 55 and the casting 52. The air chamber 60 has an inlet 61 that is connected to a further inlet passage 62 and an outlet fitting 63 that corresponds to outlet 16 in FIGURE 1. The air tight chamber 60 further has a nozzle or outlet means 64 that is surrounded by a shoulder 65 in the casting 52. The shoulder 65 provides support for diaphragm 55 and substantially encloses an air space 66. Shoulder 65 has one or more grooves 66a to provide air passage from air chamber 60 to outlet means 64.

The outlet means or nozzle 64 opens into a second air tight chamber 70 that is immediately below the diaphragm 54. The diaphragm 54 is supported by a spring 71 that holds the diaphragm 54 in the upper position, as shown when the device is inactive. At the center 72 of the diaphragm 54 there is a projection of a soft material that forms a second valve in cooperation with the nozzle or outlet means 64. It is thus apparent if diaphragm 54 is forced in a downward direction against the spring 71, that the projection 72 is forced against the open end of the nozzle or outlet means 64 to perform a valving function. It is noted that the diaphragm 54 is completely sealed around its edges 73 by the casting 51 to complete the second fluid tight chamber for the device. This chamber 70 has an opening 74 that corresponds with the connection 31 of FIGURE 1.

As has been previously noted, the casting 51 seals diaphragm 54 at its edge 73 and the casting 51 forms the top of the housing means 50. The casting 51 also provides for the third air tight chamber 80 which has a single opening 81 that leads to the outlet 30 corresponding to 30 in FIGURE 1. The top of the casting 51 has a mounting stud 82 to provide convenient mounting of the overall device 14. The casting 51 also has an opening 83 that connects to port 15 which corresponds to the inlet 15 of FIGURE 1. Between the inlet 83 in the casting 51 and the inlet passage 62 of casting 52, an orifice 84 is provided. Its function will be described in connection with the operation of the present device. Many of the minor details of how the chambers and passages of the present device are sealed and many of their exact configurations have been left without specific discussion to avoid confusing the novel structure. The basic contours disclosed are of a production version of the device and these could be varied considerably for convenience without any variance in the scope of the invention. Any further discussion of the specifics of the structure would merely obscure the novel features contained in the present invention.

Operation

The device 14 disclosed in FIGURE 2 is a pneumatic air motion relay. Specifically, the device is designed to provide two basic functions. The first function is to sense the operation of blower 34, and second, to operate the actuator portion if the blower is operating along with appropriate control pressures being supplied to the inlet 15 of the device.

If it is assumed that the blower is inoperative, there is no pressure differential supplied on pipes 32 and 33 to the ports 30 and 31. As a result of this, the spring 71 forces the diaphragm 54 in an upward direction so that the projection 72 of the diaphragm 54 is in the position shown. This provides a communication between the nozzle or outlet means 64 to the top of the diaphragm 55. If pressure is applied to the inlet 15, the pressure passes through the orifice 84 to the inlet 62 where it divides to the inlet 61 and outlet 16. With pneumatic pressure supplied to the outlet 16, the pressure in turn is supplied to the pipe 17 and the valve 22 and the temperature controller 25. The pressure thus supplied would normally activate the valve 22 and the temperature controller 25 but the pressure is bled off continuously to port 31 through groove 66a, air space 66, and nozzle 64. It is thus apparent that when no pressure differential exists between the ports 30 and 31, the application of a pneumatic pressure to the inlet 15 merely is bled from chamber 60 through the outlet means 64 to the port 31. Even though the pneumatic thermostat 11 may be calling for the system to operate, the fact that no pressure differential exists on pipes 32 and 33 keeps the system inactive.

If the blower 34 is operating, a pressure differential between the pipes 32 and 33 exists, as they are placed in the inlet and outlets of the blower 34. The pressure differential that exists is applied to the ports 30 and 31 thereby creating a pressure differential between chambers 70 and 80 across the diaphragm 54. The pressure differential in the chambers 70 and 80 drive the diaphragm 54 in a downward direction forcing the projection 72 to cover the nozzle or outlet means 64. As soon as the outlet means 64 is blocked, any pressure applied to the pipe 15 that is connected to the control device 14 immediately starts to apply a pressure to the top of the diaphragm 55 by filling the chamber 60. As soon as the pressure begins to build up in chamber 60, the diaphragm 55 is driven in a downward direction moving the cup 59 downward thereby operating lever 40 in a downward direction through the previously described lever arrangement. When the cup 59 has moved its required stroke the pressure builds up in the outlet 16 that supplies pressure to the pipe 17 which in turn supplies the necessary energizing pneumatic pressure to the actuator 21 of valve 22 to supply an air conditioning media through the heat exchanger 24. This pressure is also supplied to the control device 25 to place the system in normal operation.

As soon as the blower 34 has either been turned off through the operation of switch 37, or if the blower ceases to operate due to a malfunction, the pressure differential occurring on pipes 32 and 33 ceases. As soon as a pressure differential across the pipes 32 and 33 ceases, the pressure differential on the ports 30 and 31 becomes zero. At this time, the spring 71 drives the diaphragm 54 to the up position as shown in FIGURE 2. This opens the outlet means 64 to the port 31 thereby bleeding off the pressure contained above the diaphragm 55 in the chamber 60. This allows the springs contained in the actuator portion of the device to drive the actuator to the up position and also bleeds off any pressure that was contained in the pipes 17 thereby de-activating the pneumatic actuator 21 and the temperature control device 25. It thus becomes apparent that at any time the blower 34 ceases to operate, either through operation of the electrical switch 37 or due to a malfunction, the control device 14 is immediately returned to an off condition.

In FIGURE 3 a modification of the devices is disclosed in a partial cross section. The modification provides for a slightly different valving arrangement for control of air flow through the device wherein the nozzle 64 and the projection 72 of FIGURE 2 have been replaced by a different type of valving device. The corresponding parts of FIGURES 2 and 3 will carry the same numbers and only the newly added parts will be indicated by any change in reference numeral. A modified casting 52a has been provided to seal the air chamber 60 over the diaphragm 55. A shoulder 65a is provided as a stop for the diaphragm 60 so that the upward movement of cup 59 does not block the valving, as will be described. The casting 52a has a projection 90 into the air chamber 70. The projection 90 has a screw 91 and a leaf spring 92 attached thereto. The screw 91 holds the leaf spring 92 in place and the spring 92 projects over a nozzle 93 that cooperates with a valve member 94. The valve member 94 is loosely attached by a pin arrangement 95 to the leaf spring 92 to form valve means with the nozzle 93. Immediately beneath the nozzle 93 is a filter element 96 that is utilized to keep any dirt particles in the system from plugging the nozzle 93.

The end 97 of the spring 92 rests on a small spring 98 that is supported on a recess 99 in the casting 52a. Opposite the spring 98 is a projection 100 that is molded into the diaphragm 54 in an integral fashion and corresponds to the projection 72 in FIGURE 2. The balance of the structure of FIGURE 3 is substantially the same as FIGURE 2 and the brief description of the operation of this modification will clearly bring out the similarites.

*Operation*

With no differential air pressure supplied to the ports 30 and 31 any air supplied to chamber 60 merely passes between the diaphragm 55 and the housing 52a to the filter 96. The air then passes through the orifice 93 and is bled past the valve member 94 (which is open) where it passes into the chamber 70. The chamber 70 is in communication with port 31 and the air pressure is bled off to the atmosphere. It is thus apparent that when no pressure differential exists between ports 30 and 31, the spring 98 holds the leaf spring 92 sufficiently high so that the valve 94 does not block the orifice 93 to prevent air passage.

As soon as a differential pressure is applied between ports 30 and 31 the diaphragm 54 is forced in a downward direction causing the projection 100 to apply a force to the end 97 of the leaf spring 92. This overcomes the spring 98 and drives the valve member 94 in a downward direction sealing the orifice 93. It is thus apparent that the function of the valve structure disclosed in FIGURE 3 is identical to the valve function provided in FIGURE 2 between the nozzle 64 and the projection 72 of the diaphragm 54. The structure disclosed in FIGURE 3 provides a positive valving arrangement by means of a lever advantage thereby preventing any possible sticking of a diaphragm in an inoperative position.

It is apparent from the discussion of the pneumatic air motion relay 14, that a device that is exceedingly compact, inexpensive, and relatively foolproof has been disclosed. The arrangement of chambers and passages could be modified in their location and the general structure of the device could be modified extensively by one skilled in the art without varying from the broad concept of the present invention, not by the specific configuration of parts as disclosed and described, but only by the scope of the appended claims.

We claim:

1. A device responsive to an operating pressure and to a differential pressure to provide a mechanical output from the device, including: housing means having a plurality of fluid chamber means; said housing means further having a fluid actuator portion including force output means to provide a mechanical force outside of said housing means; said actuator portion including a first of said fluid chamber means and said first chamber means being sealed by a flexible wall; said first chamber means further having a fluid inlet continuously connected to an operating fluid pressure and fluid outlet means; second fluid chamber means sealed by diaphragm means with said second chamber means adjacent said first chamber means; said outlet means including valve means connecting said first and said second chamber means with said valve means operated by said diaphragm means and sealed thereby; third chamber means adjacent said diaphragm means and sealed thereby; spring supported lever means attached to said housing means and biased against said diaphragm means; said lever means moving with said diaphragm means to in turn actuate said valve means to control said actuator portion of said device; and said second chamber means and said third chamber means each having port means; said port means provided to receive a differential pressure to operably move said diaphragm means to in turn actuate said valve means to control said actuator portion by bleeding said fluid pressure to the atmosphere.

2. A device responsive to an operating pressure and to a differential pressure to provide a mechanical output from the device as described in claim 1, wherein all of said three chambers are coaxial to one another.

3. A device responsive to an operating pressure and to a differential pressure to provide a mechanical output from the device, including: housing means having a plurality of fluid chamber means; said housing means further having a fluid actuator portion including force output means to provide a mechanical force outside of said housing means with said force output means including a lever pivoted on said housing means; said actuator portion including a first of said fluid chamber means and said first chamber means being sealed by a flexible wall; said first chamber means further having a fluid inlet continuously connected to an operating fluid pressure and fluid outlet means; second fluid chamber means sealed by diaphragm means with said second chamber means adjacent said first chamber means; said outlet means including valve means connecting said first and said second chamber means with said valve means operated by said diaphragm means and sealed thereby; third chamber means adjacent said diaphragm means and sealed thereby; and said second chamber means and said third chamber means each having port means; said port means provided to receive a differential pressure to operably move said diaphragm means to in turn actuate said valve means to control said lever by bleeding said fluid pressure to the atmosphere.

4. A device responsive to an operating pressure and to a differential pressure to provide a mechanical output from the device as described in claim 3, wherein said diaphragm means integrally forms a valve member included in said valve means.

5. A device responsive to an operating pressure and to a differential pressure to provide a mechanical output from the device as described in claim 4, wherein all of the three said chambers and said valve means are coaxial with each other.

References Cited by the Examiner

UNITED STATES PATENTS

| 2,637,946 | 5/1953 | Parks | 91—47 |
| 2,973,772 | 3/1961 | Oglesby | 137—82 |

MARTIN P. SCHWADRON, *Primary Examiner.*

P. T. COBRIN, P. E. MASLOUSKY, *Assistant Examiners.*